United States Patent [19]

Knudson

[11] 4,089,533

[45] May 16, 1978

[54] RESILIENT SEAL RINGS WITH DUAL LIPS

[75] Inventor: Charles B. Knudson, Hillsdale, Utah

[73] Assignee: Microdot Inc., Greenwich, Conn.

[21] Appl. No.: 822,559

[22] Filed: Aug. 8, 1977

[51] Int. Cl.² .......................... F16J 9/20; F16J 15/32
[52] U.S. Cl. ..................................... 277/152; 277/165;
    277/206 R
[58] Field of Search .............................. 277/138-140,
    277/152, 153, 165, 206 R, 9, 9.5, 10, 11

[56] References Cited

U.S. PATENT DOCUMENTS

| 2,387,182 | 10/1945 | Procter | 277/153 X |
| 3,118,681 | 1/1964 | Fuehrer | 277/9 |
| 3,447,819 | 6/1969 | Borsum et al. | 277/9 X |

FOREIGN PATENT DOCUMENTS

| 965,449 | 4/1975 | Canada | 277/165 |
| 2,012,240 | 10/1971 | Germany | 277/206 R |

Primary Examiner—Robert S. Ward, Jr.
Attorney, Agent, or Firm—Harness, Dickey & Pierce

[57] ABSTRACT

A seal ring for use on a piston or rod has a static sealing periphery that provides sealing contact across its entire surface and includes an interference lip for high sealing contact and a dynamic sealing periphery that has large and small diameter portions with a flexible flared lip hinged to the end of the large diameter portion and extending from it along most of the length of the small diameter portion but being radially spaced from it.

7 Claims, 4 Drawing Figures

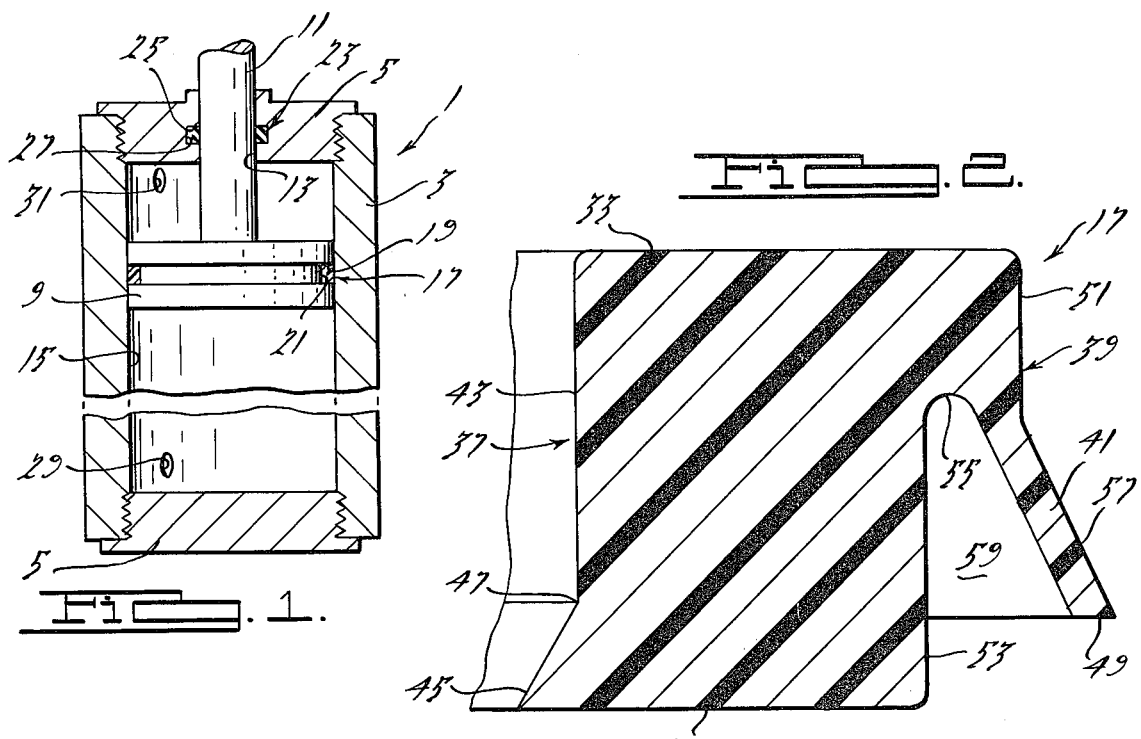

RESILIENT SEAL RINGS WITH DUAL LIPS

BRIEF SUMMARY OF THE INVENTION

It is the purpose of this invention to provide a seal suitable for pneumatic or low pressure hydraulic applications that is efficient as a seal, is stable, and has low friction characteristics.

The invention accomplishes this purpose by means of a seal that is roughly rectangular in cross section and has a static sealing periphery and a dynamic sealing periphery which are substantially parallel to each other. Substantially the entire static sealing periphery is adapted for sealing contact but an interference lip provides a load point to insure sealing. The outer sealing periphery has a flared, hinged, low friction lip that is spaced a substantial distance away from the seal body so that it can flex under various conditions to prevent any portion of the seal from becoming a squeeze seal.

DESCRIPTION OF THE DRAWINGS

FIG. 1 is a schematic longitudinal cross section through a fluid pressure cylinder, with parts omitted, broken away, and simplified for ease of illustration, in which two species of seals embodying the invention are utilized;

FIG. 2 is a cross section through a part of an enlarged seal of this invention as used on the piston in FIG. 1 but showing it in a free state;

FIG. 3 is a cross section through a part of an enlarged seal as used on the rod in FIG. 1 and embodying the invention;

FIG. 4 is a cross section through a modified form of dynamic sealing lips shown in a reversed position from the lips of FIG. 2; and FIG. 5 is a view similar to FIG. 2 but showing the seal in operative position.

DESCRIPTION OF THE INVENTION

A pneumatic or low pressure hydraulic cylinder 1 is schematically shown in FIG. 1 and has a cylindrical body 3 closed at opposite ends by end caps 5 and 7. It contains a piston 9 with a concentric rod 11 extending through an opening 13 in the end cap 7. The piston 9 has means providing a dynamic seal with respect to the wall 15 of the cylinder body 3; and this includes a seal ring 17 embodying the invention which is mounted in an annular groove 19 extending concentrically around the periphery of the piston and having a bottom wall 21. The end cap 7 has means providing a dynamic seal with respect to the outer surface of the cylindrical rod 11 and this includes a seal ring 23 embodying the invention which is mounted in an annular groove 25 in the end cap extending concentrically around the opening 13 and having a bottom wall 27. Ports 29 and 31 on opposite sides of the piston 9 illustrate means for admitting and exhausting pressure fluid and air as the piston 9 and rod 11 move in juxtaposition, respectively, to the cylinder wall 15 and the end cap well defining opening 13.

Referring to FIG. 2, the piston seal 17 has flat parallel end faces 33 and 35 which are perpendicular to the seal axis, an inner periphery 37 for static sealing to the bottom wall 21 of groove 19, and an outer periphery 39 that has an outwardly flared, flexible rectangular lip 41 for dynamic sealing to the wall 15 of the cylinder body 3. The major portion 43 of the inner periphery 37 is a cylindrical wall concentric with the axis of the seal but the end of the periphery toward which the flared lip 41 extends has a stubby inwardly projecting triangular lip 45 that axially overlaps at its root end 47 the tip end 49 of the lip 41. In use, the entire inner periphery 37 can serve as a sealing surface against the bottom wall 21. However, the lip 45 forms a flare or interference which assures static sealing contact as well as forming a load point along the static periphery 37 as the seal is pressurized. The heavy construction of periphery 37 along with its full line of contact promotes the stability of the seal under all conditions.

The relatively thin lip 41 provides a dynamic seal with minimum drag but the substantial flare gives sufficient interference on the dynamic surface to insure adequate sealing. The tip 49 is preferably straight for pneumatic applications because it increases the area of lip contact to minimize permeation of gaseous media and for contaminated environments because it creates a scraping action of solid and semisolid particles. FIG. 4 shows a modified lip 41' having a back beveled tip 49' that minimizes hydroplaning and is therefore desirable for dry hydraulic applications.

The outer periphery 39 has cylindrical coaxial cylindrical wall sections 51 and 53 and an annular groove 55 of substantially semicircular or U-shaped cross section at the inner end of the longer wall 53 so that it overlaps to some extent the shorter wall 51 which blends into the outer surface 57 of annular lip 41. The void 59 between the lip and wall 53 is therefore slightly deeper than the maximum contact length 57 of the lip to provide a free hinging action of the lip and minimize the possibility that it may become a squeeze seal. Also, the void 59 is large enough to allow the lip 41 to retract under eccentric load conditions without creating a squeeze effect. These features enable the lip to effectively operate at low friction.

Seal 23 for the rod 11 has a cross section which is the reverse of that in seal 17 but has the same advantages and features. Thus, the inner periphery 61 is the dynamic seal and the outerperiphery 63 is the static seal. The wall portion 65 and stubby lip 67 of the outer periphery seat in the bottom 27 of end cap groove 25 with the advantages that were mentioned for seal 17. The two cylindrical wall portions 69 and 71 of the inner periphery 61 are separated by the annular groove 73 and void 75 with the thin, flexible lip 77 flaring inwardly from the wall 69 so that the tip 79 has the smallest I.D. and the highest contact pressure with the outer surface of the rod 11.

The seals may be made of various homogenous resilient materials of suitable physical properties, such as polyurethane or other thermoplastics. It may also be constructed of dual durometer materials where the static sides and most of the body are of a harder material, which may include relatively rigid thermoplastics to increase stability, while the dynamic lip and hinge portion may be of a softer, more resilient material to increase performance and life.

It will be recognized that the seal of this invention is capable of providing a very effective, low friction seal since fluid pressure in the void will hold the flexible tip tightly against the relatively movable surface. On the static side the stubby lip together with the effect of the rest of the static periphery provides good sealing and these in combination with the extremely heavy construction give stability under all conditions.

Modification may be made in the specific details shown without departing from the spirit and scope of the invention.

I claim:

1. A seal to inhibit flow of fluid along a joint between relatively movable parts comprising a body of resilient sealing material having a static seal periphery and a dynamic seal periphery and a pair of end faces extending between the peripheries, said static seal periphery having a wall extending most of the distance between said end faces and an outwardly extending stubby lip adjacent one of the end faces, said dynamic seal periphery having first and second wall sections substantially parallel to each other and to said static periphery wall and extending inwardly toward each other respectively from the two end faces and overlapping between said end faces, a curved wall in said dynamic periphery forming a groove between the overlapping portions of said wall sections, the first of said wall sections being closer to said static periphery than the second and located adjacent said one end face that is adjacent said stubby lip, said dynamic periphery including a thin flexible lip forming an extension of the second wall section and extending in the direction of said one end face and flaring outwardly away from said first wall section.

2. A seal ring for a low pressure piston or rod or the like conprising an annular body of resilient sealing material having an axis and a static seal periphery and a dynamic seal periphery each concentric with said axis, said body having first and second end faces extending transversely of said axis between the peripheries, said static seal periphery having a cylindrical wall extending most of the distance between said end faces and an outwardly extending stubby lip adjacent the first of the end faces, said dynamic seal periphery having first and second cylindrical wall sections extending inwardly toward each other respectively from the two end faces and overlapping between said end faces, a curved annular wall in said dynamic periphery forming a circular groove between the overlapping portions of said wall sections, the first of said wall sections being of less diameter than the second and located adjacent said first end face, said dynamic periphery including a thin flexible annular lip forming an extension of the second wall section and extending in the direction of said first end face and flaring outwardly away from said first wall section.

3. A seal as set forth in claim 2 wherein the flexible lip overlaps a portion of the stubby lip.

4. A seal as set forth in claim 3 wherein the first wall section is substantially longer than the second and extends over more than half the distance between the end faces.

5. A seal as set forth in claim 2 wherein the tip of the flexible lip is normal to said axis when the seal is in the free state.

6. A seal as set forth in claim 2 wherein the tip of the flexible lip is back bevelled with respect to said axis when the seal is in the free state.

7. A seal ring to inhibit flow of fluid along a joint between relatively movable parts comprising an annular body of resilient sealing material having an axis and static seal periphery and dynamic seal periphery each concentric with said axis and first and second end faces extending transversely of said axis between the peripheries, said static seal periphery having a cylindrical wall extending between said end faces and forming a static sealing surface, said dynamic seal periphery having first and second coaxial cylindrical wall sections with the first section being substantially smaller in diameter than the second but of greater length than the second, the first wall section extending inwardly from the first end face and the second wall section extending inwardly from the second end face, a curved annular wall in said body interconnecting adjacent inner ends of said wall sections, said dynamic periphery including a thin flexible annular lip forming an extension of the second wall section extending in the direction of said first face and flaring radially outwardly away from said first wall section.

* * * * *